Dec. 25, 1956 H. E. MORRISON 2,775,047
DRIER CONTROL
Filed Jan. 23, 1952 2 Sheets-Sheet 1
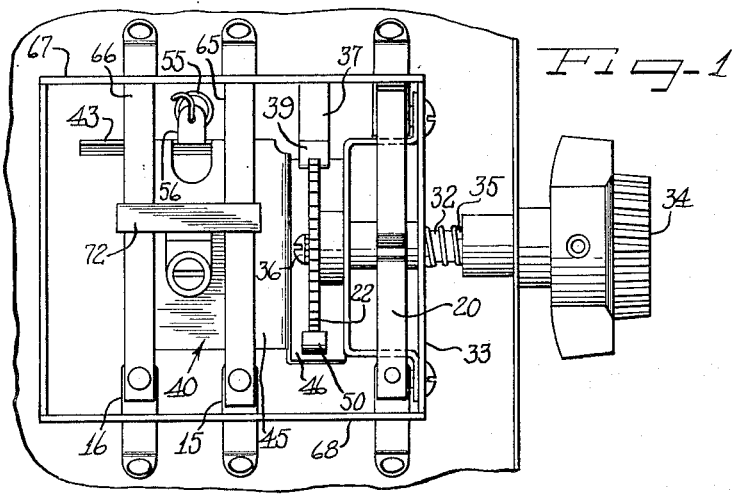
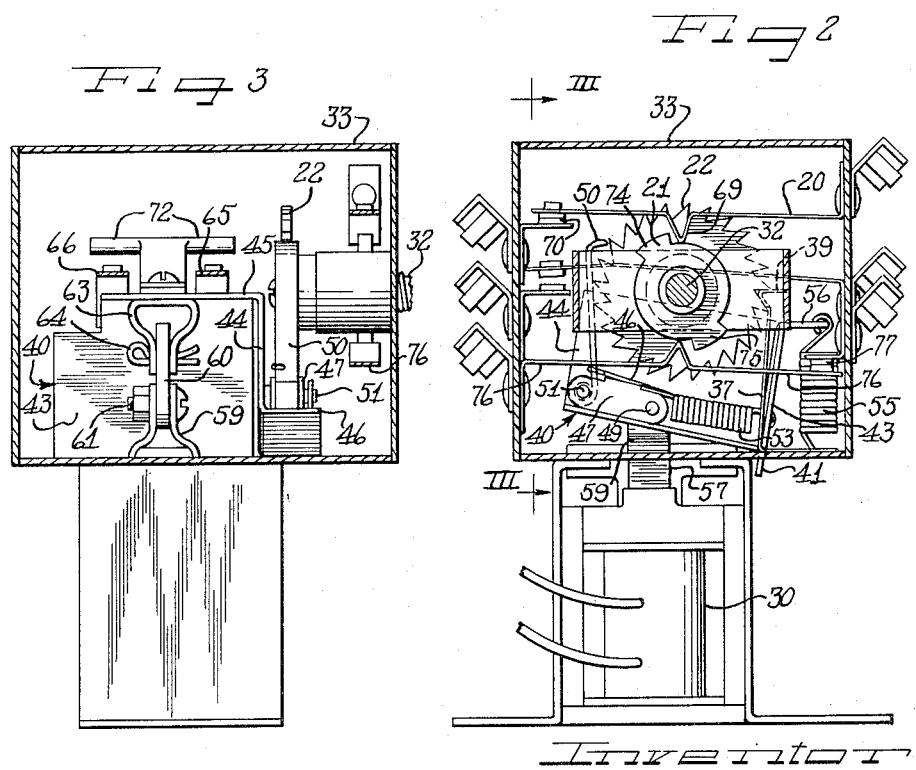
Inventor
Harold E. Morrison

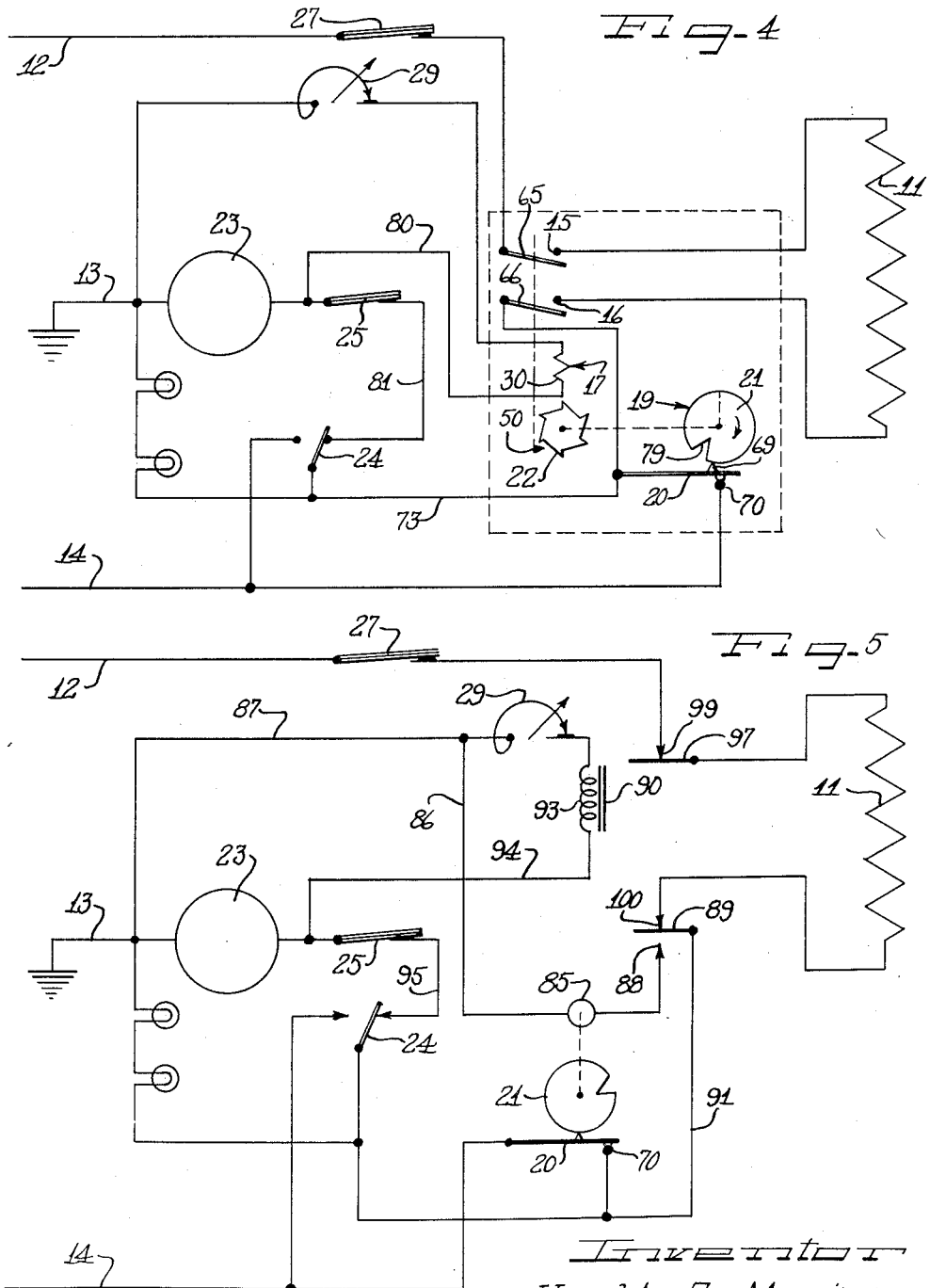

United States Patent Office 2,775,047
Patented Dec. 25, 1956

2,775,047

DRIER CONTROL

Harold E. Morrison, St. Joseph, Mich., assignor, by mesne assignments, to Whirlpool-Seeger Corporation, St. Joseph, Mich., a corporation of Delaware Application January 23, 1952, Serial No. 267,769

4 Claims. (Cl. 34—45)

This invention relates to improvements in drier controls and more particularly relates to a cycling control for controlling the drying operation of household clothes driers of either the gas or electrically heated types.

A principal object of my invention is to improve upon the control of the drying operations of clothes dryers by providing a timer controlled drier control, in which the timer device may cycle many times prior to shutting down the machine.

A further object of my invention is to provide a novel and improved form of drier control, operating during the cooling cycles of the drier.

A still further object of my invention is to provide a novel and improved form of timer controlling the operation of an automatic drier including a timer and means under the control of a thermostat, operating the timer during the cooling cycle of the dryer.

A still further object of my invention is to provide a simple and efficient drier control including a timer controlled by a predetermined temperature rise within the drier and operating only when enough water has left the articles being dried to cause a temperature rise and then operating during the cooling cycle of the drier.

A further and more detailed object of my invention is to provide a novel and improved form of drier control particularly adapted to control a drier of an automatic rotating drum type of household clothes dryer including a heating unit supplying heat to effect the drying of the articles within the drier drum, a sequence timer and timer switch operated by the timer, and a thermostat connecting the timer in the circuit at the end of a heating cycle to operate in accordance with the cooling of the drier drum.

These and other objects of my invention will appear from time to time as the following specification proceeds and with reference to the accompanying drawings wherein:

Figure 1 is a fragmentary plan view of a timer which may be used to carry out the drier control of my invention;

Figure 2 is a partial sectional view in side elevation of the timer shown in Figure 1 with one side wall removed;

Figure 3 is a sectional view taken substantially along the line III—III of Figure 2;

Figure 4 is a wiring diagram of a drier control circuit having one form of timer constructed and operating in accordance with my invention embodied therein; and Figure 5 is a wiring diagram illustrating a modified form in which my invention may be embodied.

In the embodiment of my invention illustrated in the drawings, the drier control is shown as being operative to control the energization of a heating unit 11 which may be an electric heating coil, or may be a gas heating element in which the control would control the energization of a solenoid controlling the opening and closing of the main burner valve.

Figure 4 of the drawings diagrammatically shows main line conductors 12, 13 and 14, and contacts 15 and 16 of a relay 17, for connecting the heating unit 11 with the conductors 12 and 14 to energize said heating unit. I have also shown a timer switch 20 operated by a cyclic timer cam 21, for initially instigating the drying operation, and a ratchet wheel 22 operated by the relay 17 upon each cycle of energization thereof for cyclically operating the timer cam 21. I have also shown a drier motor 23, a door switch 24 for connecting said motor in the main power circuit when the door and timer switch 20 are closed. I have also shown a thermostatically operated control switch 25 opening the circuit to the motor 23 upon overload thereof, determined by the heat of the motor 23, a safety thermostat 27 opening the circuit to the heater element 11 upon excessive heat conditions within the drier cabinet, and an adjustable thermostat 29 controlling energization of a coil 30 of the relay 17, in accordance with the cooling of the drier and the clothes therein.

The operation of the circuit and the various elements just described will hereinafter more clearly appear as this specification proceeds and upon the better understanding of the timer, as will now be described.

The timer 19 is shown in Figures 1 through 3 as comprising the timer cam 21 mounted on a horizontal shaft 32 extending within a timer casing 33 and rotatably supported therein. A hand operated positioning or control knob 34 is shown as being mounted on a squared end 35 of the shaft 32 for turning said shaft by hand and initially instigating the drying operation and also moving the timer cam 21 to the desired position to determine the cycles required to dry the particular goods within the dryer. The shaft 32 is shown as having a ratchet wheel 22 on its inner end and secured thereto for rotation therewith by a machine screw 36. An indexing device 37 is shown as being in the form of a leaf spring mounted on the bottom of the casing 33 and as extending upwardly therefrom into position to engage the teeth of the ratchet wheel 22. The leaf spring 37 has an inturned end portion 39 engageable with the teeth of the ratchet 22 for indexing the same.

A cradle 40 is shown as having a depending tongue 41 extending through a slot (not shown) formed in the bottom of the casing 33 and pivotally mounting said cradle to the bottom of said casing for movement about a horizontal axis. The cradle 40 is shown as having a vertical end wall 43 from which the tongue 41 depends, and a side wall 44 extending along one side of said cradle from a top wall 45 thereof. The side wall 44 is shown as having a shelf 46 extending outwardly from the bottom thereof.

A link 47 is piovtally mounted on the side wall 44 on a pivotal pin 49. The link 47 extends along the shelf 40, and rests thereon when in a free condition. A pawl 50 is pivotally connected to the outer or free end of the link 47 on a pivotal pin 51 and extends upwardly therefrom for engagement with the teeth of the ratchet 22. A tension spring 53 is shown as being connected from the end wall 43 to the pawl 50 adjacent the upper margins of the link 47, to urge said pawl into engagement with the teeth of the ratchet 22. The point of connection of said spring to said pawl is close enough to the link 47, to avoid the tendency of said spring to pivot said link upwardly. A tension spring 55 is shown as being connected between the bottom of the casing 33 and an outwardly extending tongue 56 of the cradle 40, and biases said cage in the inclined position shown in Figure 2, with the pawl 50 in position to engage a tooth of the ratchet 22 upon pivotal movement of said cradle toward the bottom of the casing 33.

The cradle 40 is pivoted about the axis of connection of the tongue 41 to the bottom of the casing 33 upon the energization of the magnet coil 30 of the relay 17. An armature 57 is slidably mounted within the magnet coil 30 and extends upwardly therefrom and has a yoke 59 extending upwardly from its upper end, within which is pivotally connected a link 60 by a nut and bolt 61. The opposite end of the link 60 is pivotally connected to a yoke 63, shown as depending from the bottom of the top wall 45 of the cradle 40, by means of a cotter pin 64.

Upon deenergization of the magnet coil 30, the spring 55 will bias the cradle 40 in the upwardly inclined position shown in Figure 2, with the pawl 50 in position to engage a tooth of the ratchet 22 upon downward movement of said pawl. Upon energization of the magnet coil 30, the armature 57 will move downwardly within said coil and pivot the cage 40 downwardly into engagement with the bottom of the casing. This will bring the pawl 50 into engagement with a tooth of the ratchet 22 and pivotally move said ratchet and the cam 21, a distance determined by the required movement of the cam 21 for each cooling cycle of the drier.

Contact arms 65 and 66 are secured to one wall 67 of the casing 33 and extend thereacross in aligned and parallel relation with respect to each other; to a position adjacent on opposite wall 68 of said casing. The contact arms 65 and 66 are engaged with the contacts 15 and 16, respectively, upon energization of the magnet coil 30 by engaging arms 72 spaced above the contact arms 65 and 66 and secured to the top wall 45 of the cradle in spaced relation with respect thereto. Energization of the magnet coil 30 pulls the engaging arms 72 downwardly into contact with the contact arms 65 and 66 to close the circuit through said contact arms and the contacts 15 and 16 engaged thereby. Engagement of said contact arms with said contacts will close a circuit to the heater element 11 from the main line conductor 12 to the timer contact arm 20. The contacts 15 and 16 are shown as being mounted on and extending inwardly from the wall 68 of the casing 33.

The timer contact arm 20 is shown as having the depending V-shaped engaging surface 69 disposed intermediate its ends and engaging the timer cam 21. When the depending engaging surface 69 is in engagement with the reduced diameter circumferential portion of the cam 21, the contact arm 20 will come into engagement with a contact 70 and close a circuit to the magnet coil 30 of the relay 17. Closing of the circuit to said relay coil will thus energize said relay and effect turning of the ratchet 22 and cam 21 a predetermined distance, and will also close the circuit to the heater element 11 through the safety thermostat 27, contact arm 65, contact 15 to the heater element 11 through the contact 16, contact arm 66, a conductor 73 and conductor 13 to ground.

As shown in Figure 2, the cam timer 21 has two lobes 74 and 75 and two oppositely arranged contact arms 20 and 76, the arm 20 of which engages the contact 70 and the arm 76 of which engages a contact 77. The contact arm 76 and contact 77 are not necessary to the operation of the circuit shown in Figures 4 and 5 and operate in the same manner as the contact arm 20 and contact 70, so need not herein be described further. It should further be noted that in Figure 4 the timer cam 21 is shown as having a circumferential periphery with a notch 79 therein instead of the lobe 74 shown in Figure 2. This showing in Figure 4 is for illustrative purposes only and since the cams in Figures 2 and 4 have the same function in the circuit, and since one may be substituted for the other, the same general reference characters are applied to each cam.

In Figure 4, when the depending engaging portion 69 of the contact arm 20 is in engagement with the recess 79, the circuit through the contact 70 and conductor 14 will be broken. When this occurs the circuit through the magnet coil 30, conductor 80, the motor overload thermal switch 25, a conductor 81, door switch 24 and the conductor 73 will be broken and the contacts 15 and 16 of said relay will open. This will open the circuit to the heat element 11. The circuit to the motor 23 will also be opened.

The knob 34 may be advanced manually to start the motor 23 and also instigate the heating operation when the door switch 24 is closed. Manual advance of the knob 34 in a clockwise direction will turn the timer cam 21 in the same direction and will move the engaging portion 69 of the contact arm 20 out of the notch 79 into engagement with the plane circumferential surface of the cam 21, and close the circuit between said contact arm and the contact 70. This will energize the magnet coil 30 and retract the armature 57 therein, to rotate the pawl 22 and timer cam 21 a predetermined distance which may be equal to the space between two teeth. Energization of the magnet coil 30 will also close the circuit through the contacts 15 and 16 and connect the heater unit 11 in the circuit to heat the drier, as has been mentioned before, it being understood that where the drier is a gas drier, the circuit to the magnet coil for the main burner valve will be closed to open said valve and light the burner in a well known manner.

The thermostat 29 is shown as being an adjustable thermostat, adjustable to open the circuit to the magnet coil 30 of the relay 17 at the required temperature. When the thermostat 29 is closed and the drier is in operation, with the contact arm 20 closing the circuit to the contact 70 and the conductor 14, and the heater unit 11 connected in the circuit by closing of the contacts 15 and 16, the drier will carry out a drying cycle.

When enough moisture has been removed from the clothes to raise the temperature within the drier sufficiently to operate the thermostat 29, said thermostat will open. This will deenergize the magnet coil 30 of the relay 17, opening the circuit through the contacts 15 and 16 thereof and also opening the circuit to the heater unit 11. The contacts 15 and 16 will then remain open until the temperature within the drier cabinet has been reduced sufficiently to close the adjustable thermostatic switch 29, it being understood that when said switch is open the motor 23 continues to operate, and is connected in the circuit through the overload thermostatic switch 25, conductor 81, the door switch 24, the conductor 73, contact arm 20, contact 70 and conductor 14.

Immediately upon closing of the adjustable thermostatic switch 29, the magnet coil 30 will be energized. This will move the armature 57 to engage the pawl 50 with a tooth of the ratchet 22 and move said ratchet a distance equal to the space between two ratchet teeth. This will advance the cam in a counterclockwise direction, a corresponding distance. The circuit through the contacts 15 and 16 will also be closed and heat element 11 will be energized to again heat the inside of the drier until sufficient moisture has been removed from the clothes to raise the temperature within the drier drum and cabinet an amount sufficient to again open the adjustable thermostatic switch 29. The cooling cycle will then be repeated, and when the temperature within the drier cabinet has been reduced sufficiently to cause the thermostatic switch 29 to again close, the magnet coil 30 will again be energized, advancing the ratchet 22 and cam 21 a distance equal to the space between two teeth and closing the circuit to the heater unit 11.

When initially starting the drying operation, the knob 34 may be manually turned to position the engaging end 69 of the contact arm 20 any desired position along the periphery of the cam 21. A suitable dial (not shown) may be provided on the outside of the drier cabinet with indicia thereon indicating the number of cooling cycles desired, or indicating high, low, and various intermediate drying cycles, to take care of the various drying loads required.

Thus loads that are to be damp dried may be dried by setting the knob to the low indicia marking or number, which may be number 1, indicating that one cooling cycle is all that is necessary to damp dry the clothes within the drier. At the end of this one cooling cycle the engaging end 69 of the contact arm 20 will drop in the recess 79 of the cam 21, and open the circuit through said contact arm to the conductor 14. This will deenergize the motor 23 as well as the circuit to the heater unit 11, previously deenergized upon opening of the adjustable thermostatic switch 29. It should here be understood, that at the end of the final cooling cycle, the drier motor 23 continues in operation until the cooling cycle has been completed and until the drier drum has cooled sufficiently to close the adjustable thermostatic switch 29. When this occurs, the magnet coil 30 will be energized to move the timer cam 21 a distance sufficient for the engaging end 69 of the switch 30 to drop in the recess 79 and open the circuit to the drier motor 23, as well as effect opening of the circuit to the heater unit 11.

All normal loads may be dried on an intermediate or #2 setting of the knob 34, with the adjustable thermostat set at medium or high temperature, it being understood that when the knob 34 has been turned to the #2 setting there will be two complete cycles of cooling before the drier motor 23 is shut off.

Loads that are harder to dry, such as a single bath towel, may be dried on a #3 setting, meaning that the heat is turned on and off three times before the machine has been stopped, while thick rugs and articles difficult to dry may be dried on a #5 setting indicating five cooling cycles or the turning on and off of the heat five times before the machine is stopped. These thick articles may take as long as two hours to dry, but the time schedule on the timer is not affected because the timer does not rotate during the heating and drying process.

In the modified form of my invention illustrated in Figure 5, a timer motor 85 has been substituted for the pawl 50 and ratchet wheel 22. The circuit is otherwise similar to that shown in Figure 4, so like part numbers will be applied to the same parts as shown in Figure 4. In this circuit the timer motor 85 is connected in parallel with the drier motor 23 through a conductor 86 connected with a conductor 87, having connection with the conductor 13. The timer motor 85 is connected with a conductor 14 through a contact 88 and contact arm 89 of a relay 90, a conductor 91, contact 70 and contact arm 20 of the timer.

The contact arm 89 of the relay 19 is engaged with the contact 88, to close the circuit through the timer motor 85 upon deenergization of a magnet coil 93 of the relay 90, as by opening the adjustable thermostatically operated switch 29.

When the thermostatically operated switch 29 is closed, the magnet coil 93 of the relay 90 will be energized through conductors 13 and 87, thermally operated switch 29, conductor 94, motor overload switch 25, conductor 95, door switch 24, contact 70, engaging contact arm 20 and conductor 14 connected with the contact 70. Energization of the magnet coil 93 will also close the circuit between a contact arm 97 and a contact 99 of the relay 90 and a contact arm 89 and contact 100 of said relay, and close the circuit through the heater unit 11, to energize said heater unit and heat the drier. When the heater unit 11 is energized the circuit from the contact 88 to the contact 89 is broken and the timer motor 85 will stop.

As soon, however, as sufficient moisture has been removed from the articles being dried to raise the temperature within the drier cabinet to the extent necessary to open the thermostatically operated switch 29, the magnet coil 93 of the relay 90 will be deenergized and the contact arms 97 and 89 will drop out, opening the circuit to the heater unit 11 and closing a circuit from the contact 88 to the contact arm 89. This will energize the timer motor 85 and cause said motor to rotate the timer cam 21 until the cooling cycle has been completed and the temperature within the drier cabinet and drum has dropped sufficiently to close the adjustable thermostatically operated switch 29, and again energize the magnet coil 93 to close the circuit through the contacts 99 and 100, and connect the heater unit 11 in the circuit, to heat the drum for a second drying cycle.

With the form of my invention illustrated in Figure 5, the cooling cycles may be the same as in the form of my invention shown in Figure 4, and when the timer cam 21 is set to dry thick articles, which may take as long as two hours to dry, the time schedule on the dry control timer will not be affected because the timer rotates only during the cooling process and is not in operation during the heating and drying process.

It may be seen from the foregoing that a novel and improved form of drier control has been provided for controlling the drying operation of a clothes drier during the cooling rather than the heating cycles, eliminating the guessing of the time required to dry the load in question and only coming into operation when the temperature within the drier cabinet is hot enough to open the circuit to the heating element, or deenergize the solenoid for the main burner valve, if the drier should be a gas drier, and then rotate the timer cam either by the pawl and ratchet timer shown in Figures 1 through 4 at the end of the cooling cycle, or by the timer motor shown in Figure 5 during the cooling cycle.

It will be understood that various modifications and variations of the present invention may be effected without departing from the spirit and scope of the novel concepts thereof.

I claim as my invention:

1. In an automatic clothes drier, a control circuit therefor operable to control the drying operation in accordance with succession of cooling cycles, a power circuit, a heater unit, a relay having a magnet coil and two contacts closed upon energization of said coil and connecting said heater unit in said power circuit upon closing of said contacts, a thermostatically operated switch connected in the circuit to said magnet coil and deenergizing said magnet coil and opening the circuit to said heater unit upon predetermined temperature rises, a sequence timer including a timer cam and a timer switch operated thereby, a timer motor for operating said timer cam, said timer cam also being manually operable to instigate the drying operation, said timer switch closing upon the initial turning of said cam and opening at the end of a cycle of rotation of said cam, and said relay also having a third contact connected in series with said timer switch and timer motor, and closing upon deenergization of said magnet coil and the opening of the circuit to said heater unit, to connect said timer motor in said power circuit during a cooling cycle.

2. A drier control circuit particularly adapted to control the drying cycle of a clothes drier including a rotating drier drum, a heater unit for heating the interior of said drum, a main power circuit, a sequence timer including a timer cam, a relay having a magnet coil and two contacts connecting said heater unit in said power circuit upon energization of said magnet coil, a timer motor, said relay having another contact closing upon deenergization of said magnet coil and the opening of said first contacts and a thermostatically operated switch connected in the energizing circuit to said magnet coil and opening upon predetermined temperature rises, to effect operation of said timer motor until the temperature within the drier drum has cooled sufficiently to close said thermostatically operated switch.

3. In an automatic clothes drier including a rotatable drier drum, a drive motor for said drier drum, a heater unit, a control circuit for said heater unit for controlling drying in accordance with a succession of cooling cycles, an energizing circuit for said control circuit and drive motor, a relay having a contact connecting said heater unit in said energizing circuit when closed, a thermostat controlling operation of said relay and effecting the operation of said relay to close said contact at temperatures below the temperature setting of said thermostat and effecting the operation of said relay to open said contact and the circuit to said heater unit upon predetermined temperature rises, a sequence timer including a timer cam and a timer switch operated thereby, a timer motor for operating said timer cam, said timer cam also being manually operable to initiate a drying operation, said timer switch closing upon the initial turning of said timer cam to initiate a drying operation and remaining closed to the termination of the drying operation at the end of a cycle of rotation of said timer cam, and said relay also having another contact connected in series with said timer switch and said timer motor, and closing upon operation of said thermostat upon predetermined temperature rises and the opening of the circuit to said heater unit, to connect said timer motor in said energizing circuit during a cooling cycle.

4. In an automatic clothes drier including a rotatable drier drum, a drive motor for said drier drum, a heater unit, a control circuit for said heater unit for controlling the drying operation in accordance with a succession of cooling cycles, an energizing circuit, a relay having a magnet coil and a contact closed upon energization of said magnet coil and connecting said heater unit in said energizing circuit upon closing of said contact, a thermostatically operated switch connected in the circuit to said magnet coil and deenergizing said magnet coil and opening the circuit to said heater unit upon predetermined temperature rises, a sequence timer including a timer cam and a timer switch operated thereby, a timer motor for operating said timer cam, said timer cam also being manually operable to initiate a drying operation and connecting said first mentioned motor in the energizing circuit and maintaining said motor in the energizing circuit until the end of the drying operation, and said relay having another contact connected in series with said timer switch and said timer motor and closing upon the deenergization of said magnet coil, and the opening of the circuit to said heater unit, to connect said timer motor in said energizing circuit only upon deenergization of said heater unit during a cooling cycle.

References Cited in the file of this patent
UNITED STATES PATENTS

| | | |
|---|---|---|
| 1,388,541 | Woodbury | Aug. 23, 1921 |
| 1,675,160 | Carroll | June 26, 1928 |
| 2,285,121 | Mason | June 2, 1942 |
| 2,398,880 | Broglie | Apr. 23, 1946 |
| 2,436,714 | De Moss | Feb. 24, 1948 |
| 2,505,041 | Gorsuch | Apr. 25, 1950 |
| 2,524,438 | Graves | Oct. 3, 1950 |
| 2,590,808 | Wagner | Mar. 25, 1952 |
| 2,654,961 | Manecke | Oct. 13, 1953 |